(12) United States Patent
Zhang

(10) Patent No.: US 11,172,489 B2
(45) Date of Patent: Nov. 9, 2021

(54) METHOD AND DEVICE FOR RELAY IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 464 days.

(21) Appl. No.: 16/162,425

(22) Filed: Oct. 17, 2018

(65) Prior Publication Data

US 2019/0053249 A1 Feb. 14, 2019

Related U.S. Application Data

(63) Continuation of application No. PCT/CN2017/078242, filed on Mar. 26, 2017.

(30) Foreign Application Priority Data

Apr. 17, 2016 (CN) .......................... 201610238959.8

(51) Int. Cl.
*H04W 72/08* (2009.01)
*H04W 72/04* (2009.01)
(Continued)

(52) U.S. Cl.
CPC .......... *H04W 72/085* (2013.01); *H04B 7/155* (2013.01); *H04B 17/309* (2015.01);
(Continued)

(58) Field of Classification Search
USPC ....................................................... 370/329
See application file for complete search history.

(56) References Cited

U.S. PATENT DOCUMENTS

| 9,094,093 B2 * | 7/2015 | Zhang ................... H04L 5/0044 |
| 9,980,306 B2 * | 5/2018 | Shi ......................... H04W 8/005 |
| 2009/0227258 A1 * | 9/2009 | Youn ..................... H04B 7/2606 |
| | | 455/445 |

(Continued)

FOREIGN PATENT DOCUMENTS

| CN | 101795169 A | 8/2010 |
| CN | 101960787 A | 1/2011 |

(Continued)

OTHER PUBLICATIONS

Chinese Search Report issued in corresponding application No. 201610238959.8, dated Apr. 17, 2019.

(Continued)

*Primary Examiner* — Alpus Hsu
*Assistant Examiner* — Hooman Houshmand
(74) *Attorney, Agent, or Firm* — Maschoff Brennan

(57) ABSTRACT

A method and apparatus in a user equipment and a base station for narrowband communication based on a cellular network are provided. The user equipment receives first information, and then detects the first wireless signal including at least one of {a first characteristic sequence, a first reference signal, and a second information} in a first time window. The transmitter of the first wireless signal is a second node, and the transmitter of the first information and the second node are non-co-located. The first information determines at least one of {the first time window, a parameter of the first characteristic sequence, a parameter of the first reference signal}. The embodiments save power consumption of the relayed user equipment and ensure that the channel quality of the sidelink is better than the channel quality of the uplink. In addition, the embodiments utilize the first flag bit to reduce the air interface overhead.

11 Claims, 5 Drawing Sheets

(51) Int. Cl.
*H04W 88/04* (2009.01)
*H04L 5/00* (2006.01)
*H04W 52/02* (2009.01)
*H04B 17/309* (2015.01)
*H04B 7/155* (2006.01)
*H04W 8/00* (2009.01)

(52) U.S. Cl.
CPC .......... *H04L 5/0048* (2013.01); *H04L 5/0053* (2013.01); *H04W 8/005* (2013.01); *H04W 52/0219* (2013.01); *H04W 52/0245* (2013.01); *H04W 72/042* (2013.01); *H04W 72/0413* (2013.01); *H04W 88/04* (2013.01); *Y02D 30/70* (2020.08)

(56) References Cited

U.S. PATENT DOCUMENTS

| | | | | |
|---|---|---|---|---|
| 2012/0015662 A1* | 1/2012 | Zhang | ................... | H04L 1/0026 455/445 |
| 2012/0026936 A1* | 2/2012 | Zhang | ................... | H04L 5/0048 370/315 |
| 2016/0088607 A1* | 3/2016 | Sorrentino | .......... | H04W 72/048 370/329 |
| 2016/0242219 A1* | 8/2016 | Shi | ........................ | H04W 8/005 |

FOREIGN PATENT DOCUMENTS

| | | |
|---|---|---|
| CN | 103916903 A | 7/2014 |
| CN | 104185247 A | 12/2014 |
| CN | 105228248 A | 1/2016 |
| CN | 105472702 A | 4/2016 |

OTHER PUBLICATIONS

Chinese Office Action issued in corresponding application No. 201610238959.8, dated Apr. 24, 2019.

Chinese Notice of Granting Patent Right issued in corresponding application No. 201610238959.8, dated Jul. 23, 2019.

* cited by examiner

METHOD AND DEVICE FOR RELAY IN UE AND BASE STATION

TECHNICAL FIELD

The present disclosure relates to transmission schemes in wireless communication systems, and more particularly to a method and a device for supporting wireless relay transmission.

BACKGROUND

A Layer-3 relay base station scheme is proposed in the R (Release) 9 of 3rd Generation Partner Project 3GPP. The relay base station has the function of a normal base station for a User Equipment (UE), and can independently schedule data and transmit a downlink HARQ-ACK (Hybrid Automatic Repeat reQuest).

In a conventional 3GPP system, data transmission occurs between a base station and a UE. In 3GPP R12, D2D (Device to Device) communication is proposed and discussed. The essential feature of D2D is to allow data transmission between UEs. In 3GPP R13, eD2D (Enhancements to LTE Device to Device) is proposed, and its main feature is to introduce the UE relay function. In eD2D, a relay user equipment (Relay UE) relays data exchange between a remote user equipment (Remote UE) and a base station.

In the 3GPP RAN (Radio Access Network) #69 plenary meeting, NB-IOT (NarrowBand Internet of Things) was proposed. Further, in the 3GPP RAN #71 plenary meeting (RP-160655), IoT (internet of thing) and FeD2D (Further Enhancements to LTE Device to Device) for wearable devices are proposed. In FeD2D, D2D communication may be implemented through an air interface similar to NB-IoT.

In the existing D2D/eD2D, the UE periodically transmits Sidelink Synchronization Signals and PSDCH (Physical Sidelink Discovery Channel). In addition, in eD2D, how the Remote UE selects the Relay UE is implementation-dependent—that is, it does not require to change the standard.

A typical application scenario of FeD2D is that there are multiple wearable devices around an intelligent terminal. The intelligent terminal relays data exchange between the wearable device and the base station, that is, the smart terminal and the wearable device are a Relay UE and a Remote UE, respectively.

SUMMARY

The inventors have found through research that periodically transmitting or receiving Sidelink Synchronization Signals and PSDCH would increase the power consumption of the UE, thereby reducing the standby time. Standby time is a very important factor for low-cost UEs.

In addition, the selection of the traditional Relay UE is performed by the Remote UE, that is, the Remote UE is required to receive signals from the Relay UE and the base station, thus increasing the complexity of the Remote UE receiver.

The present disclosure provides a solution to the above problems. It should be noted that, in the case of no conflict, the features among the embodiments of the present disclosure may be combined with each other arbitrarily. For example, the embodiments in the UE and the features in the embodiments of the UE of the present disclosure may be applied to a base station, and vice versa. For another example, the embodiments of D2D transmitting UE (i.e., transmitting a wireless signal on a sidelink) and the features in the embodiments of the present disclosure may be applied to a D2D receiving UE (i.e., receiving the wireless signal on a sidelink) and vice versa. Further, although the original intention of the present disclosure is directed to FeD2D (i.e., D2D transmission is based on the narrowband), the solution of the present disclosure is also applicable to wideband D2D relay (i.e., D2D transmission is based on the broadband).

A method for use in a UE for relay communication is disclosed. The method comprises:
receiving first information; and
detecting a first wireless signal in a first time window, the first wireless signal comprising at least one of {a first characteristic sequence, a first reference signal, second information}.

Wherein the transmitter of the first wireless signal is a second node. The transmitter of the first information and the second node are non-co-located. The first information is used to determine at least one of {the first time window, a parameter of the first characteristic sequence, a parameter of the first reference signal}. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node.

In one embodiment, the first information is indicated by physical layer signaling.

In one embodiment, the first information is indicated by DCI (Downlink Control Information).

In one embodiment, the transmitter of the first information and the second node being non-co-located means that the transmitter of the first information and the second node are two different communication devices.

In one embodiment, the transmitter of the first information and the second node being non-co-located means that no wired connection exists between the transmitter of the first information and the second node.

In one embodiment, the transmitter of the first information and the second node being non-co-located means that the transmitter of the first information and the second node are located at different locations.

In the foregoing two embodiments, the base station dynamically triggers the transmittance of the first wireless signal, which is different from the traditional semi-static configuration. The foregoing two embodiments can save the power consumption of the transmitter of the first wireless signal to the greatest extent.

In one embodiment, the first time window is associated with a time resource occupied by the first information.

In one embodiment, the first time window is indicated by the first information.

In one embodiment, the transmitter of the first information is a serving cell of the UE.

In one embodiment, the first time window includes a positive integer number of subframes.

In one embodiment, the first wireless signal occupies a portion of the time resource in the first time window.

In one embodiment, the first information is indicated by higher layer signaling.

In one embodiment, the first characteristic sequence comprises Zadoff-Chu sequence.

In one embodiment, the first characteristic sequence comprises a pseudo-random sequence.

In one embodiment, the first characteristic sequence comprises a Zadoff-Chu sequence and a pseudo-random sequence.

In one embodiment, the a parameter of the first characteristic sequence are used to generate the first characteristic sequence.

In one embodiment, the a parameter of the first reference signal are used to generate a reference signal sequence corresponding to the first reference signal.

In one embodiment, the first identifier is an RNTI (RNTI Radio Network Temporary Identifier) of the second node.

In one embodiment, the first identifier is a PLMN-ID (Public Land Mobile Network-Identifier) of the second node.

In one embodiment, the first identifier is a Layer-2 ID of the second node.

In one embodiment, the first information is used to receive the second information. As a sub-embodiment of the embodiment, the first information includes a first parameter, and the first parameter is used to generate a scrambling code sequence corresponding to the second information, wherein the first parameter is an integer.

In one embodiment, the first information includes the second information.

In one embodiment, the second identifier used to determine the first cell means that the second identifier includes a PCI (Physical Cell Identifier) of the first cell.

In one embodiment, the second identifier used to determine the first cell means that the second identifier includes an ECGI (E-UTRAN Cell Global Identifier) of the first cell.

In one embodiment, the first cell is a serving cell of the UE.

In one embodiment, the first cell is a cell other than the serving cell of the UE.

Specifically, according to an aspect of the present disclosure, the method includes:

determining a first channel quality according to the first wireless signal; and transmitting third information indicating at least a first flag bit between the first channel quality and a first flag bit.

Wherein, the first channel quality is for a channel from the second node to the UE. The first flag bit includes one information bit, and the first flag bit is used to determine whether the UE can relay a wireless signal for the second node.

Different from the channel quality (and reporting) of Sidelink measured by the Remote UE in the disclosed scheme, the UE in the above aspects serves as the relay node of the second node and measures the channel quality of the Sidelink and report. In the above aspect, the second node does not need to monitor the Sidelink, thereby reducing the receiver complexity.

In one embodiment, the first channel quality includes an RSRP (Reference Signal Received Power).

In one embodiment, the first channel quality includes RSRQ (Reference Signal received quality).

In one embodiment, the first channel quality includes a CQI (Channel Quality Indicator).

In one embodiment, the unit of the first channel quality is dBm.

In one embodiment, the unit of the first channel quality is milliwatts.

In one embodiment, the third information includes the first channel quality, and the third information is carried by the high layer signaling.

In one embodiment, the third information includes the first flag bit, and the third information is carried by the physical layer signaling.

Specifically, according to an aspect of the present disclosure, the method includes:

receiving fourth information, wherein the transmitter of the fourth information is the transmitter of the first information.

Wherein the fourth information includes a second channel quality. The second channel quality is for a channel from the second node to the first cell. The first flag bit indicates whether the first channel quality is lower than the second channel quality, or the first flag bit indicates whether the first channel quality is higher than the second channel quality.

In the conventional solution, the UE reports the channel quality to the base station. In the above aspect, the second channel quality is transmitted to the UE by the base station, and the UE is able to determine the first flag bit by using the second channel quality. Compared with transmitting the first channel quality, transmitting the first flag bit by the UE can reduce uplink resource overhead and improve transmission efficiency.

In one embodiment, the fourth information is carried by the higher layer signaling.

In one embodiment, the second channel quality comprises RSRP.

In one embodiment, the second channel quality comprises RSRQ.

In one embodiment, the second channel quality comprises CQI.

In one embodiment, the unit of the second channel quality is dBm.

In one embodiment, the unit of the second channel quality is milliwatts.

Specifically, according to an aspect of the present disclosure, the second information includes a second channel quality, and the second channel quality is for a channel from the second node to the first cell. The first flag bit indicates whether the first channel quality is lower than the second channel quality, or the first flag bit indicates whether the first channel quality is higher than the second channel quality.

In one embodiment, the second information is carried by SCI (Sidelink Control Information).

In the above embodiment, the UE receives the second channel quality by using Sidelink. The above embodiment can accelerate for the UE to determine whether it is suitable to serve as a Relay UE. Further, the foregoing embodiment is suitable for the UE and the second node configured in different serving cells.

The present disclosure discloses a method for use in a UE for relay communication. The method comprises:

receiving first information, wherein the first information is used to determine at least one of {a first time window, parameters of a first characteristic sequence, parameters of a first reference signal}; and transmitting a first wireless signal in a first time window, wherein the first wireless signal comprises at least one of {a first characteristic sequence, a first reference signal, second information}.

Wherein the receiver of the first wireless signal comprises a first node. The transmitter of the first information and the first node are non-co-located. The second information includes at least one of {a first identifier, a second identifier}. The first identifier is an integer and the second identifier is an integer. The first identifier is used to determine the UE, and the second identifier is used to determine a first cell. The first cell is a serving cell of the UE.

Specifically, according to an aspect of the present disclosure, the method includes:
receiving fourth information.
Wherein the fourth information includes a second channel quality. The first wireless signal is used to determine a first channel quality. The second information includes a second channel quality. The first channel quality is for a channel from the UE to the first node. The second channel quality is for a channel from the UE to the first cell. The second channel quality is used to determine a first flag bit. The first flag bit includes one information bit, and the receiver of the second information includes a transmitter of the first flag bit. The first flag bit is used to determine whether the first node can relay a wireless signal for the UE.

In one embodiment, the first wireless signal is used to determine a second channel quality.

In one embodiment, the fourth information is carried by the higher layer signaling.

In one embodiment, the fourth information is carried by the physical layer signaling.

The present disclosure discloses a method for use in a base station for relay communication. The method comprises:
transmitting first information.
Wherein the first information is used to determine at least one of {the first time window, a parameter of the first characteristic sequence, a parameter of the first reference signal}. The first wireless signal is transmitted in the first time window. The first wireless signal includes at least one of {the first characteristic sequence, the first reference signal, and second information}. The transmitter of the first wireless signal is a second node. The base station and the second node are non-co-located. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node.

In one embodiment, the first cell is maintained by the base station.

In one embodiment, the first cell is maintained by a network device other than the base station.

In one embodiment, the receiver of the first information includes a first node and a second node. The first node and the second node being non-co-located. In one embodiment, the first node is a UE and the second node is a UE.

Specifically, according to an aspect of the present disclosure, the method further includes:
receiving the third information, wherein the third information indicates at least one of {first channel quality, first flag bit}.
Wherein the transmitter of the third information is a first node. The first channel quality is for a channel from the second node to the first node. The first wireless signal is used to determine the first channel quality. The first flag bit includes one information bit. The first flag bit is used to determine whether the first node can relay a wireless signal for the second node.

In the above aspect, the Relay UE feeds back an indication (third information) of the channel quality of the Sidelink. The base station configures the Relay UE according to the indication of the channel quality. The above aspect can ensure that the channel quality of the PC5 interface is better than the channel quality of the Uu interface of the relayed UE (i.e., Remote UE).

In one embodiment, the first wireless signal is used by a transmitter of the third information to determine the first channel quality.

Specifically, according to an aspect of the present disclosure, the method further includes:
determining a second channel quality.
Wherein the second channel quality is for a channel from the second node to the first cell.

In one embodiment, the above aspect is characterized in that the method further comprises:
transmitting a fourth information.
Wherein the fourth information includes the second channel quality. The 《 receiver of the fourth information includes the first node. The first flag bit indicates whether the first channel quality is lower than the second channel quality, or the first flag bit indicates whether the first channel quality is higher than the second channel quality. The second channel quality is for a channel from the second node to the first cell.

In one embodiment, the above aspect is characterized in that the method further comprises:
transmitting backhaul information, wherein the backhaul information includes the second channel quality.
Where in the first cell is maintained by the base station.

In one sub-embodiment of the above embodiment, the serving cell of the first node is maintained by a network device other than the base station.

In one sub-embodiment of the above embodiment, the backhaul information is transmitted through the X2 interface.

In one sub-embodiment of the above embodiment, the backhaul information is transmitted through the SI interface.

In one embodiment, the above aspect is characterized in that the method further comprises:
receiving backhaul information, wherein the backhaul information includes the second channel quality.
Where in the first cell is maintained by a network device other than the base station.

In one sub-embodiment of the above embodiment, the serving cell of the first node is maintained by the base station.

In one sub-embodiment of the above embodiment, the backhaul information is transmitted through the X2 interface.

In one sub-embodiment of the above embodiment, the backhaul information is transmitted through the SI interface.

In the above two embodiments, two UEs performing D2D communication can be in coverage of different serving cells.

Specifically, according to an aspect of the present disclosure, it is characterized in that the method further comprises:
receiving the first wireless signal, wherein the first wireless signal is used by the base station to determine the second channel quality.

In the above aspect, the first wireless signal is used by both of the UE and the base station to measure the channel quality. The above aspects reduce the power consumption of the relayed UE.

Specifically, according to an aspect of the present disclosure, it is characterized in that the first flag bit indicates whether the first channel quality is lower than the second channel quality, or the first flag bit indicates the first channel quality is higher than the second channel quality.

The present disclosure discloses a user equipment for relay communication. The user equipment comprises the following modules:

a receiving module: receives first information; and a processing module: detects a first wireless signal in a first time window, the first wireless signal comprising at least one of {a first characteristic sequence, a first reference signal, second information}.

Wherein the transmitter of the first wireless signal is a second node. The transmitter of the first information and the second node are non-co-located. The first information is used to determine at least one of {the first time window, a parameter of the first characteristic sequence, a parameter of the first reference signal}. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node.

In one embodiment, the above user equipment used for relay communication is characterized in that the first processing module:

determines a first channel quality according to the first wireless signal; and transmits third information indicating at least a first flag bit between the first channel quality and a first flag bit.

Wherein the first channel quality is for a channel from the second node to the UE. The first flag bit includes one information bit, and the first flag bit is used to determine whether the UE can relay a wireless signal for the second node.

In one embodiment, the above user equipment used for relay communication is characterized in that the first receiving module receives a fourth information. The transmitter of the fourth information is the transmitter of the first information. The fourth information includes a second channel quality. The second channel quality is for a channel from the second node to the first cell. The first flag bit indicates whether the first channel quality is lower than the second channel quality, or the first flag bit indicates whether the first channel quality is higher than the second channel quality.

In one embodiment, the above user equipment used for relay communication is characterized in that the second information includes a second channel quality, and the second channel quality is for a channel from the second node to the first cell. The first flag bit indicates whether the first channel quality is lower than the second channel quality, or the first flag bit indicates whether the first channel quality is higher than the second channel quality.

The present disclosure discloses a user equipment for relay communication. The user equipment comprises the following modules:

a second receiving module receives the first information and the fourth information; and a first transmitting module: transmits a first wireless signal in a first time window;

wherein the first information is used to determine at least one of {a first time window, parameters of a first characteristic sequence, parameters of a first reference signal}. The first wireless signal includes at least one of {the first characteristic sequence, the first reference signal, second information}. The receiver of the first wireless signal includes a first node. The transmitter of the first information and the first node are non-co-located. The second information includes one or more information bits. The second information includes at least one of {a first identifier, a second identifier}. The first identifier is an integer and the second identifier is an integer. The first identifier is used to determine the user equipment, and the second identifier is used to determine a first cell. The first cell is a serving cell of the user equipment. The fourth information includes the second channel quality. The first wireless signal is used to determine a first channel quality. The second information includes a second channel quality. The first channel quality is for a channel from the user equipment to the first node. The second channel quality is for a channel from the user equipment to the first cell. The second channel quality is used to determine a first flag bit. The first flag bit includes one information bit, and the receiver of the second information includes a transmitter of the first flag bit. The first flag bit is used to determine whether the first node can relay a wireless signal to the user equipment.

The present disclosure discloses a base station for relay communication. The base station comprises the following modules:

a second processing module: transmits the first information;

wherein the first information is used to determine at least one of {a first time window, parameters of a first characteristic sequence, parameters of a first reference signal}. The first wireless signal is transmitted in the first time window. The first wireless signal comprises at least one of {the first characteristic sequence, the first reference signal, second information}. The transmitter of the first wireless signal is a second node. The base station and the second node are non-co-located. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node.

In one embodiment, the above base station used for relay communication is characterized in that the base station further comprises:

a third receiving module: receives third information, where the third information indicates at least one of {first channel quality, first flag bit}.

The transmitter of the third information is a first node. The first channel quality is for a channel from the second node to the first node. The first wireless signal is used to determine the first channel quality. The first flag bit includes one information bit. The first flag bit is used to determine whether the first node can relay a wireless signal for the second node.

In one embodiment, the above base station used for relay communication is characterized in that the second processing module: determines the second channel quality. The second channel quality is for a channel from the second node to the first cell.

In one embodiment, the base station used for relay communication is characterized in that the second processing module: transmits the fourth information. The fourth information includes the second channel quality. The receiver of the fourth information includes the first node. The first flag bit indicates whether the first channel quality is lower than the second channel quality, or the first flag bit indicates whether the first channel quality is higher than the second channel quality. The second channel quality is for a channel from the second node to the first cell.

In one embodiment, the above base station used for relay communication is characterized in that the second processing module: transmits backhaul information. The backhaul information includes the second channel quality. The first cell is maintained by the base station.

In one embodiment, the above base station used for relay communication is characterized in that the second processing module: receives backhaul information. The backhaul information includes the second channel quality. The first cell is maintained by a network device other than the base station.

In one embodiment, the base station device used for relay communication is characterized in that the second processing module: receives the first wireless signal, and the first wireless signal is used by the base station to determine the second channel quality.

In one embodiment, the base station device used for relay communication is characterized in that the first flag bit indicates whether the first channel quality is lower than the second channel quality, or the first flag bit indicates whether the first channel quality is higher than the second channel quality.

Compared with the prior art, the present disclosure has the following technical advantages of saving power consumption of relayed UEs, ensuring that the channel quality of the Sidelink is better than the channel quality of the uplink, reducing the air interface overhead by using the first flag, and supporting one-way D2D relay between cells.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the application and the characteristics of the embodiments may be arbitrarily combined if there is no conflict.

Embodiment I

Figure 1:
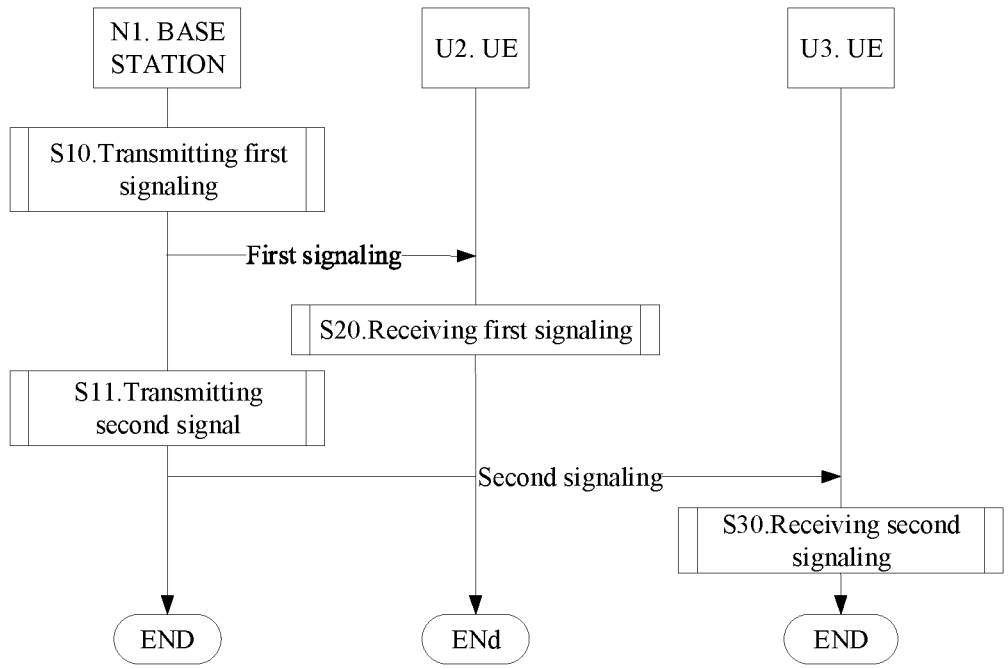
FIG. 1 is a flow chart illustrating the transmission of the first signaling and the second signaling according to an embodiment of the present disclosure.

Embodiment I illustrates a flow chart showing the transmission of the first signaling and the second signaling, as shown in FIG. 1. In FIG. 1, the base station N1 is a maintenance base station of the first cell, the first cell is a serving cell of the UE U2, and the first cell is a serving cell of the UE U3. The UE U2 is the first node and UE U3 is the second node.

For the base station N1, the first signaling is transmitted in step S10, and the second signaling is transmitted in step S20.

For UE U2, the first signaling is received in step S20.

For UE U3, the second signaling is received in step S30.

In Embodiment I, the first signaling and the second signaling both include first information, or both the first signaling and the second signaling include fourth information.

As a first sub-embodiment of Embodiment I, the first signaling and the second signaling are DCI respectively.

As a second sub-embodiment of Embodiment I, the first signaling and the second signaling are physical layer signaling respectively.

As a third sub-embodiment of Embodiment I, the first signaling and the second signaling are respectively high layer signaling.

Embodiment II

Figure 2:
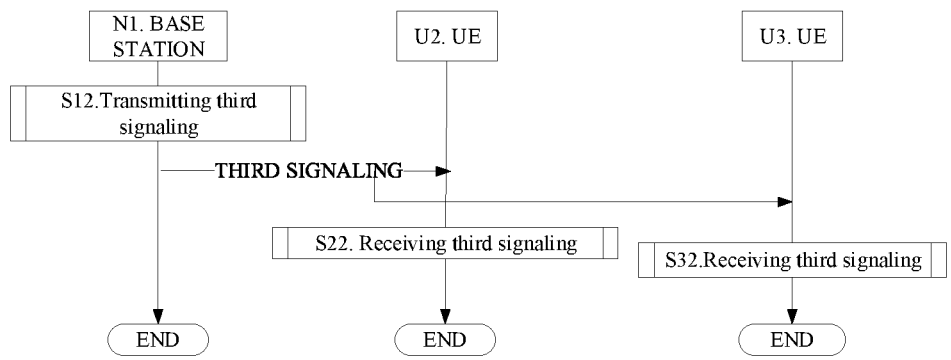
FIG. 2 is a flow chart illustrating the transmission of the third signaling according to another embodiment of the present disclosure.

Embodiment II illustrates a flow chart showing the transmission of the third signaling, as shown in FIG. 2. In FIG. 2, the base station N1 is a maintenance base station of the first cell, the first cell is a serving cell of the UE U2, and the first cell is a serving cell of the UE U3. The UE U2 is the first node and UE U3 is the second node.

For the base station N1, the third signaling is transmitted in step S12.

For UE U2, the third signaling is received in step S22.

For UE U3, the third signaling is received in step S32.

In Embodiment II, the third signaling includes first information, or the third signaling includes fourth information.

As a first sub-embodiment of embodiment II, the third signaling is DCI.

As a second sub-embodiment of Embodiment II, the third signaling is high layer signaling.

Embodiment III

Figure 3:
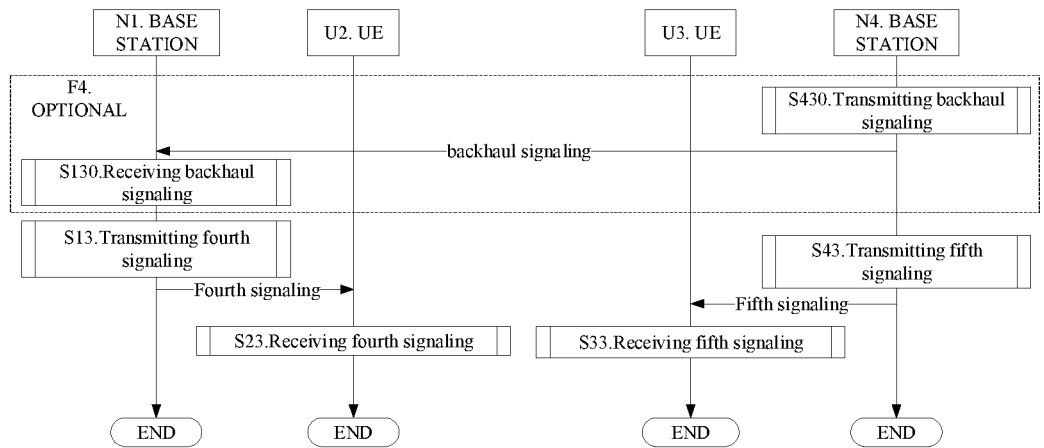
FIG. 3 is a flow chart illustrating the signaling of the UEs performing D2D communication in different cells according to one embodiment of the present disclosure.

Embodiment illustrates a flow chart showing the signaling of the UEs performing D2D communication in different cells, as shown in FIG. 3. In FIG. 3, the first cell is a serving cell of UE U3. UE U2 is the first node and UE U3 is the second node. The steps in block F4 are optional steps.

For the base station N4, the fifth signaling is transmitted in step S43.

For UE U3, the fifth signaling is received in step S33.

For the base station N1, the fourth signaling is transmitted in step S13.

For UE U2, the fourth signaling is received in step S23.

In Embodiment III, the fourth signaling and the fifth signaling respectively include first information, or the fourth signaling and the fifth signaling respectively include fourth information.

As a first sub-embodiment of Embodiment III, the fourth signaling and the fifth signaling respectively include first information. The base station N4 transmits backhaul signaling in step S430. The base station N1 receives the backhaul signaling in step S130. The backhaul signaling includes the first information.

As a second sub-embodiment of Embodiment III, the fourth signaling and the fifth signaling respectively include fourth information. The base station N4 transmits backhaul signaling in step S430. The base station N1 receives the backhaul signaling in step S130. The backhaul signaling includes the fourth information.

Embodiment IV

Figure 4:
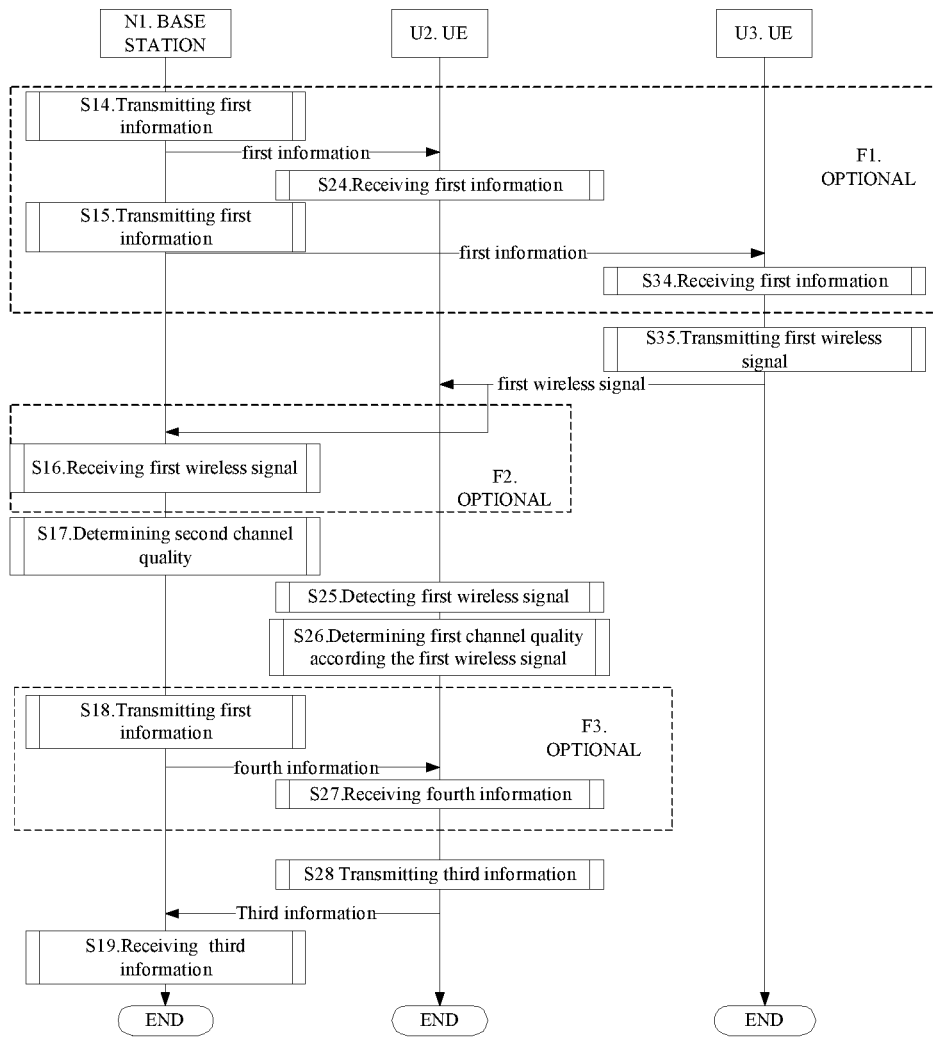
FIG. 4 illustrates a flow chart for determining channel quality of Sidelink according to one embodiment of the present disclosure.

Embodiment IV illustrates a flow chart for determining channel quality of Sidelink, as shown in FIG. 4. In FIG. 4, the base station N1 is a maintenance base station of the first cell. The first cell is a serving cell of the UE U2, and the first cell is a serving cell of the UE U3. UE U2 is the first node and UE U3 is the second node. In FIG. 4, the steps in block F1 are optional, the steps in block F2 are optional, and the steps in block F3 are optional.

For the base station N1, the first information is transmitted to the UE U2 in step S14. The first information is transmitted to the UE U3 in step S15. The second channel quality is determined in step S17. The third information is received in step S19.

For the UE U2, the first information is received in step S24. The first wireless signal is detected in the first time window in step S25. The first channel quality is determined according to the first wireless signal in step S26. The third information is transmitted in step S28.

For UE U3, the first information is received in step S34. The first wireless signal is transmitted in the first time window in step S35.

As a first sub-embodiment of Embodiment IV, the base station N1 receives the first wireless signal in the first time window in step S16, and determines the second channel quality according to the first wireless signal in step S17.

As a second sub-embodiment of the embodiment IV, the base station N1 transmits the fourth information in step S18, and the UE U2 receives the fourth information in step S27. The third information indicates the first flag.

As a third sub-embodiment of the embodiment IV, the steps in the block F1 are replaced by the steps in FIG. 2.

As a fourth sub-embodiment of the embodiment IV, the base station N1 determines the second channel quality according to the uplink radio signal other than the first radio signal transmitted by the UE U2 in step S17.

Embodiment V

Figure 5:
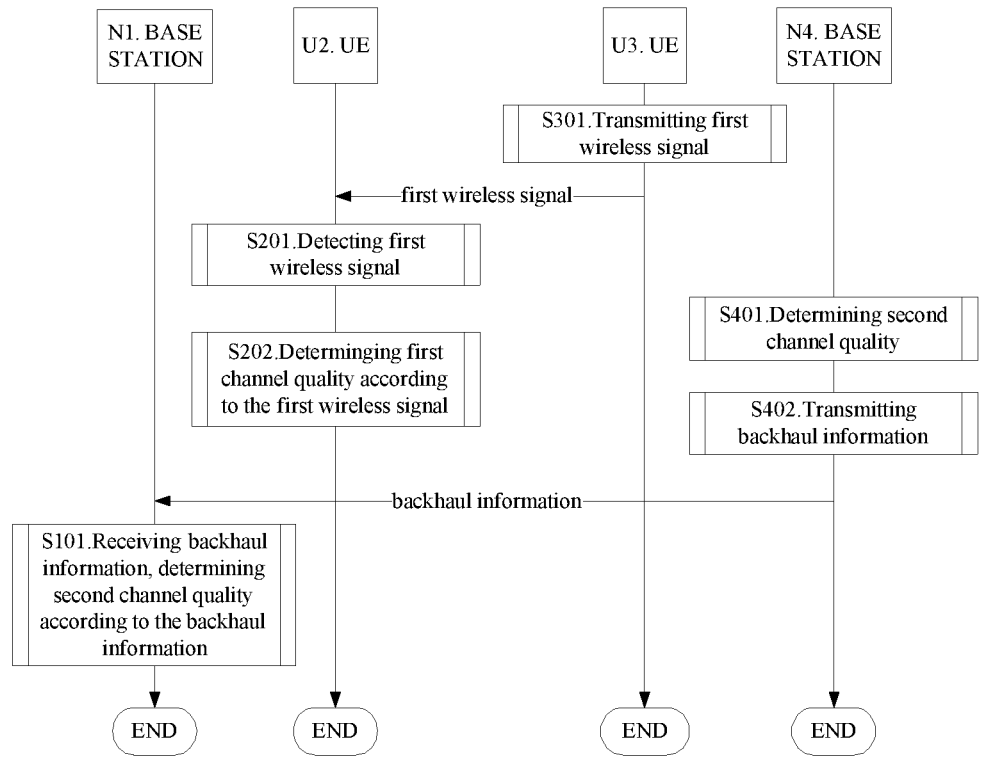
FIG. 5 illustrates a flow chart for determining channel quality of Sidelink according to another embodiment of the present disclosure.

Embodiment V illustrates a flow chart for determining channel quality of Sidelink, as shown in FIG. 5. In FIG. 5, the base station N4 is a maintenance base station of the first cell. The base station N1 is a maintenance base station of the serving cell of the UE U2. The first cell is a serving cell of the UE U3. UE U2 is the first node and UE U3 is the second node.

For the base station N1, the backhaul information is received in step S101, and the second channel quality is determined according to the backhaul information.

For UE U2, the first wireless signal is detected in a first time window in step S201, and the first channel quality is determined from the first wireless signal in step S202.

For the base station N4, the second channel quality is determined in step S401, and the backhaul information is transmitted in step S402.

For UE U3, the first wireless signal is transmitted in a first time window in step S301.

In Embodiment V, the backhaul information includes the second channel quality.

Embodiment VI

Figure 6:
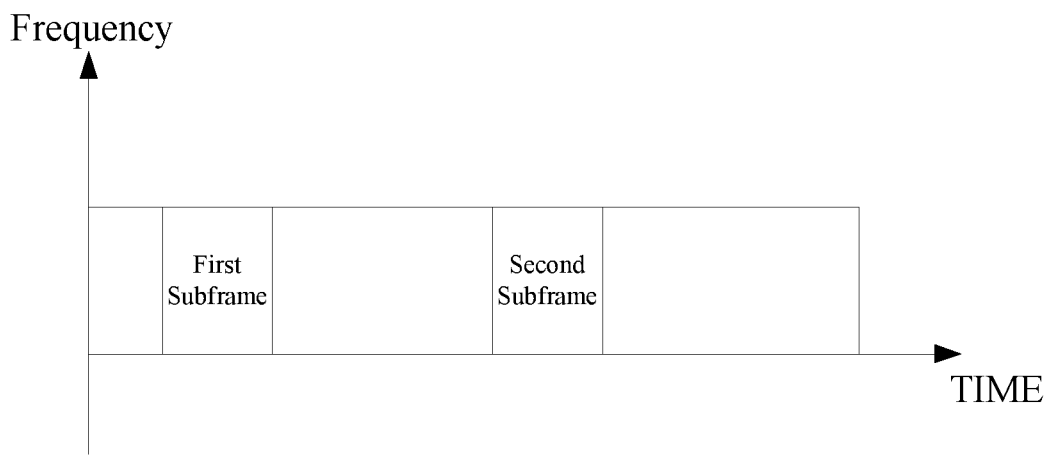
FIG. 6 shows a schematic diagram of first information indicating a first time window according to one embodiment of the present disclosure.

Embodiment VI shows a schematic diagram of first information indicating a first time window as shown in FIG. 6. In FIG. 6, in Embodiment 6, the first subframe is the last frame occupied by the first information, and the second subframe is the first subframe in the first time window. The time interval between the first subframe and the second subframe is default (i.e., no signaling configuration is required).

As a first sub-embodiment of Embodiment VI, the number of frames in the first time window is default.

As a second sub-embodiment of Embodiment VI, the number of subframes in the first time window is configured by the higher layer signaling.

Embodiment VII

Figure 7:
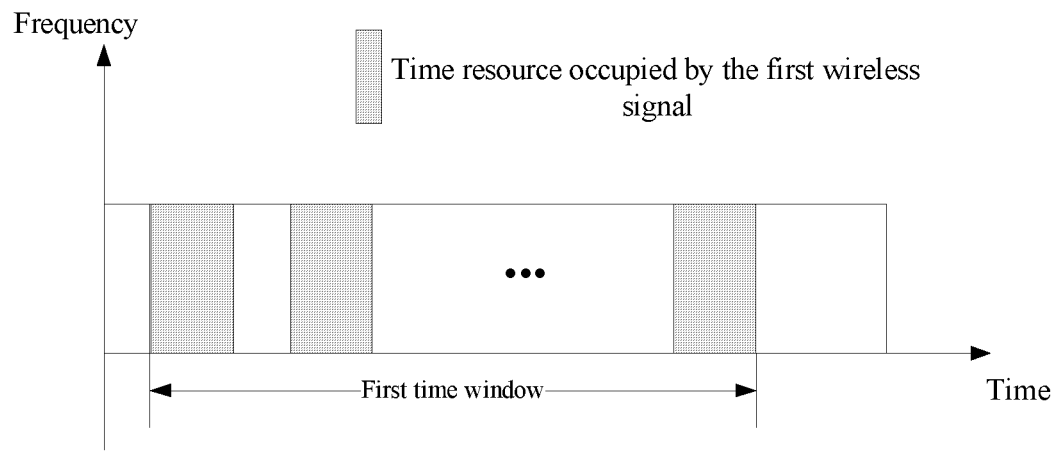
FIG. 7 shows a schematic diagram of a first time window according to one embodiment of the present disclosure.

Embodiment VII shows a schematic diagram of a first time window, as shown in FIG. 7. In FIG. 7, the cross line identifies the time domain resource occupied by the first wireless signal.

In Embodiment VII, the first wireless signal occupies a portion of the time domain resource in the first time window.

Embodiment VIII

Figure 8:
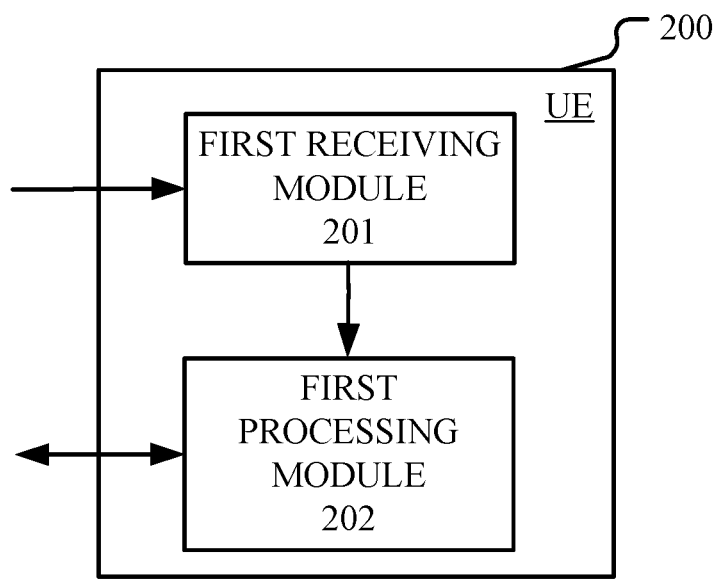
FIG. 8 is a block diagram showing the structure of a processing device in a UE according to one embodiment of the present disclosure.

Embodiment VII Illustrates a block diagram showing the structure of a processing device in a UE, as shown in FIG. 8. In FIG. 8, the UE processing device 200 mainly comprises a first receiving module 201 and a first processing module 202.

The first receiving module 201 receives the first information. The first processing module 202 detects the first wireless signal in the first time window, determine the first channel quality according to the first wireless signal, and transmit the third information.

In Embodiment VIII, the first wireless signal includes at least one of {a first characteristic sequence, a first reference signal, second information}. The transmitter of the first wireless signal is a second node. The transmitter of the first information and the second node are non-co-located. The first information is used to determine at least one of {the first time window, a parameter of the first characteristic sequence, a parameter of the first reference signal}. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node. The third information indicates the first channel quality, or the third information indicates the first flag bit. The first channel quality is for a channel from the second node to the user equipment. The first flag bit includes one information bit, and the first flag bit is used to determine whether the user equipment can relay a wireless signal for the second node.

As a first sub-embodiment of Embodiment VIII, the first characteristic sequence includes a Zadoff-Chu sequence and a pseudo-random sequence.

As a second sub-embodiment of embodiment VIII, the first information is carried by the physical layer signaling.

Embodiment VX

Figure 9:
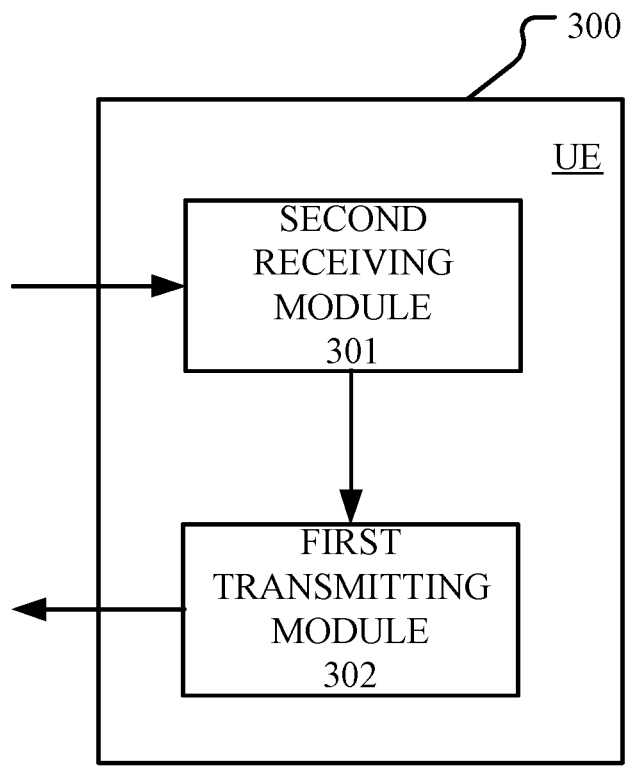
FIG. 9 is a block diagram showing the structure of a processing device in a UE according to another embodiment of the present disclosure.

Embodiment VX illustrates a block diagram showing the structure of a processing device in a UE, as shown in FIG. 9. In FIG. 9, the UE processing device 300 mainly comprises a second receiving module 301 and a first transmitting module 302.

The second receiving module 301 receives the first information and the fourth information. The first transmitting module 302 transmits the first wireless signal in the first time window.

In Embodiment VX, the first information is used to determine at least one of {a first time window, parameters of a first characteristic sequence, parameters of a first reference signal}. The first wireless signal includes at least one of {the first characteristic sequence, the first reference signal, second information}. The receiver of the first wireless signal includes a first node. The transmitter of the first information and the first node are non-co-located. The second information includes one or more information bits. The second information includes at least one of {a first identifier, a second identifier}. The first identifier is an integer and the second identifier is an integer. The first identifier is used to determine the user equipment, and the second identifier is used to determine a first cell. The first cell is a serving cell of the user equipment. The fourth information includes the second channel quality. The first wireless signal is used to determine a first channel quality. The second information includes a second channel quality. The first channel quality is for a channel from the user equipment to the first node. The second channel quality is for a channel from the user equipment to the first cell. The second channel quality is used to determine a first flag bit. The first flag bit includes one information bit, and the receiver of the second information includes a transmitter of the first flag bit. The first flag bit is used to determine whether the first node can relay a wireless signal to the user equipment.

As a first sub-embodiment of embodiment VX, the second information is carried by the high layer signaling.

As a second sub-embodiment of the embodiment VX, the first characteristic sequence includes a primary sidelink synchronization signal and a secondary sidelink synchronization signal. The first parameter of the characteristic sequence is the generation parameters $N_{ID}^{SL}$ of the sidelink synchronization signal. $N_{ID}^{SL}$ is a non-negative integer less than 336.

Embodiment X

Figure 10:
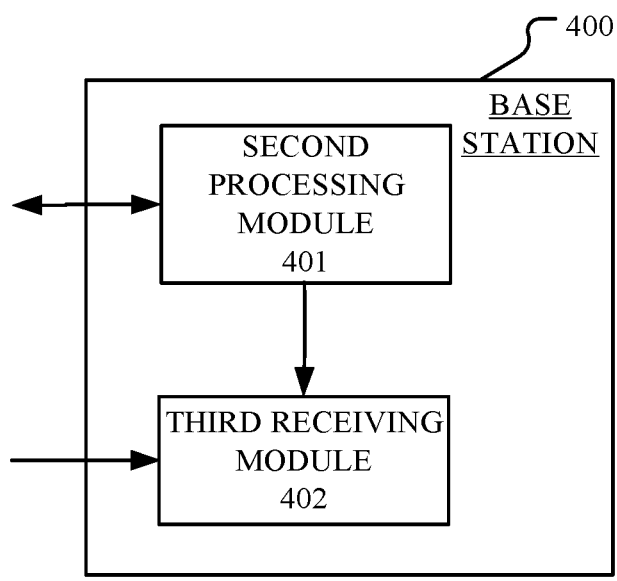
FIG. 10 is a block diagram showing the structure of a processing device in a base station according to one embodiment of the present disclosure.

Embodiment X illustrates a block diagram showing the structure of a processing device in a base station, as shown in FIG. 10. In FIG. 10, the base station processing device 400 mainly comprises a third processing module 401 and a third receiving module 402.

The third processing module 401 transmits the first information. The third receiving module 402 receives third information, where the third information indicates the first channel quality, or the third information indicates the first flag bit.

In Embodiment X, the first information is used to determine at least one of {a first time window, parameters of a first characteristic sequence, parameters of a first reference signal}. The first wireless signal is transmitted in the first time window. The first wireless signal comprises at least one of {the first characteristic sequence, the first reference signal, second information}. The transmitter of the first wireless signal is a second node. The base station and the second node are non-co-located. The second information includes one or more information bits. The second information includes at least one of {a first identifier, a second identifier}. The first identifier is an integer and the second identifier is an integer. The first identifier is used to determine the second node, and the second identifier is used to determine a first cell. The first cell is a serving cell of the second node. The transmitter of the third information is a first node. The first channel quality is for a channel from the second node to the first node. The first wireless signal is used to determine the first channel quality. The first flag bit includes one information bit. The first flag bit is used to determine whether the first node can relay a wireless signal for the second node.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to mobile phones, tablet computers, notebooks, vehicle-mounted communication equipments, wireless sensors, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to radio communication equipment s such as macro-cellular base stations, micro-cellular base stations, home base stations, and relay base station.

The above are merely the embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for use in a relay user equipment for relay communication, comprising:
   receiving first information from a base station; and
   detecting a first wireless signal in a first time window, the first wireless signal comprising second information, wherein:
      the transmitter of the first wireless signal is a remote user equipment;
      the base station and the remote user equipment are non-co-located;
      the first information is used to determine at least the first time window;
      the second information comprising one or more information bits;
      the second information comprises at least one of a first identifier, or a second identifier;

the first identifier is an integer and the second identifier is an integer;
the first identifier is used to determine the remote user equipment;
the second identifier is used to determine a first cell;
the first cell is a serving cell of the remote user equipment; and
the first time window includes at least one subframe indicated by the first information;
wherein the method further comprises:
determining a first channel quality according to the first wireless signal; and
transmitting third information indicating at least a first flag bit between the first channel quality and a first flag bit; wherein,
the first channel quality includes reference signal received power (RSRP) from the remote user equipment to the relay user equipment;
the first flag bit includes one information bit, and
the first flag bit is used to determine whether the relay user equipment can relay a wireless signal for the remote user equipment;
wherein the method further comprises:
receiving fourth information from the base: station, wherein the fourth information includes a second channel quality;
the second channel quality includes RSRP from the remote user equipment to the first cell;
the first flag bit indicates whether the first channel quality is lower than the second channel quality, or the first flag bit indicates whether the first channel quality is higher than the second channel quality;
wherein the second information comprises a second channel quality;
the second channel quality is for a channel from the remote user equipment to the first cell; and
the first flag bit indicates whether the first channel quality is lower than the second channel quality, or the first flag bit indicates whether the first channel quality is higher than the second channel quality.

2. A method for use in a remote user equipment for relay communication comprising:
receiving first information from a base station, wherein the first information is used to determine at least a first time window; and
transmitting a first wireless signal in a first time window, wherein the first wireless signal comprises at least a second information, wherein,
the receiver of the first wireless signal comprises a relay user equipment;
the base station and the relay user equipment are non-co-located;
the second information includes at least one of a first identifier, or a second identifier;
the first identifier is integer and the second identifier is an integer;
the first identifier is used to determine the remote user equipment, and the second identifier is used to determine a first cell;
the first cell is a serving cell of the remote user equipment;
the first time window includes at least one subframe indicated by the first information;
the first wireless signal is used to determine a first channel quality;
the second information includes a second channel quality;

the first channel quality includes reference signal received power (RSRP) from the remote user equipment to the relay user equipment;
the second channel quality includes RSRP from the remote user equipment to the first cell;
the second channel quality used to determine a first flag bit;
the first flag bit includes one information bit, and the receiver of the second information includes a transmitter of the first flag bit; and
the first flag bit is used to determine whether the relay user equipment can relay a wireless signal for the user equipment.

3. A method for use in a base station for relay communication, comprising:
transmitting first information;
receiving third information from a relay user equipment indicating at least a first flag, wherein,
the first information is used to determine at least a first time window;
the first wireless signal is transmitted in the first time window;
the first wireless signal includes at least second information;
the transmitter of the first wireless signal is a remote user equipment;
the base station and the remote user equipment are non-co-located;
the second information includes one or more information bits;
the second information includes at least one of a first identifier, or a second identifier;
the first identifier is an integer and the second identifier is an integer;
the first identifier is used to determine the remote user equipment and the second identifier is used to determine a first cell;
the first cell is a serving cell of the remote user equipment;
the first charnel quality includes reference signal received power (RSRP) from the remote user equipment to the relay user equipment;
the first wireless signal is used to determine the first channel quality;
the first flag bit includes one information bit;
the first flag bit is used to determine whether the relay user equipment can relay a wireless signal for the remote user equipment; and
the first time window includes at least one subframe indicated by the first information;
wherein the method further comprises:
determining a second channel quality; and
transmitting a fourth information, wherein:
the second channel quality includes RSRP from the remote user equipment to the first cell;
the fourth information includes the second channel quality;
the receiver of the fourth information includes the relay user equipment;
the first flag bit indicates whether the first channel quality is lower than the second channel quality, or the first flag bit indicates, whether the first channel quality is higher than the second channel quality; and
the second channel quality is for a channel from the remote user equipment to the first cell.

4. The method according to claim 3, wherein the method further comprises:
   transmitting backhaul information, wherein the backhaul information comprises the second channel quality;
   wherein the first cell is maintained by the base station; or the method further comprises:
   receiving backhaul information wherein the backhaul information comprises the second channel quality;
   wherein the first cell is maintained by a network device other than the base station.

5. The method according to claim 3, wherein the method further comprises:
   receiving the first wireless signal, wherein the first wireless signal is used by the base station to determine the second channel quality.

6. A relay user equipment for relay communication, comprising:
   a receiving module: receives first information from a base station; and
   a processing module configured to detect a first wireless signal in a first time window, determining a first channel quality according to the first wireless signal, and transmitting the third information, wherein:
      the first wireless signal includes at least second information;
      the transmitter of the first wireless signal is a remote user equipment;
      the base station and the remote user equipment axe non-co-located;
      the first information is used to determine at least the first time window;
      the second information includes one or more information bits;
      the second information includes at least one of a first identifier, or a second identifier;
      the first identifier is an integer and the second identifier is an integer;
      the first identifier is used to determine the remote user equipment, and the second identifier is used to determine a first cell;
      the first cell is a serving cell of the remote user equipment;
      the third information indicates at least a first flag bit;
      the first channel quality includes reference signal received power RSRP from the remote user equipment to the relay user equipment;
      the first flag bit includes one information bit, and the first flag bit is used to determine whether the relay user equipment can relay a wireless signal for the remote user equipment; and
      the first time window includes at least one subframe indicated by the first information;
   wherein the processing module receives fourth information, wherein the transmitter of the fourth information is the base station, wherein:
      the fourth information includes a second channel quality;
      the second channel quality is for a channel from the remote user equipment to the first cell; and
      the first flag bit indicates whether the first channel quality is lower than the second channel quality, or the first flag bit indicates whether the first channel quality is higher than the second channel quality.

7. The relay user equipment according to claim 6, wherein:
   the second information comprises a second channel quality;
   the second channel quality is for a channel from the second node remote user equipment to the first cell; and
   the first flag bit indicates whether the first channel quality is lower than the second channel quality, or the first flag bit indicates whether the first channel quality is higher than the second channel quality.

8. A remote user equipment for relay communication, comprising:
   a second receiving module receives first information from a base station; and
   a first transmitting module transmits a first wireless signal in a first time window, wherein:
      the first information is used to determine at least the first time window;
      the first wireless signal includes at least one of second information;
      the receiver of the first wireless signal includes a relay user equipment;
      the base station and the relay user equipment are non-co-located;
      the second information includes one or more information bits;
      the second information includes at least one of a first identifier, or a second identifier;
      the first identifier is an integer and the second identifier is an integer;
      the first identifier is used to determine the remote user equipment, and the second identifier is used to determine a first cell;
      the first cell is a serving cell of the remote user equipment;
      a fourth information transmitted by the base station includes the second channel quality;
      the first wireless signal is used to determine a first channel quality;
      the second information includes a second channel quality;
      the first channel quality includes reference signal received power (RSRP) from the remote user equipment to the relay user equipment;
      the second channel quality includes RSRP front the remote user equipment to the first cell;
      the second channel quality is used by the relay user equipment to determine a first flag hit;
      the first flag hit includes one information bit, and the receiver of the second information includes the relay user equipment;
      the first flag bit is used to determine whether the relay user equipment can relay a wireless signal to the remote user equipment; and
      the first time window includes at least one subframe indicated by the first information.

9. A base station for relay communication, comprising:
   a second processing module configured to transmit first information;
   a third receiving module configured to receive third information, where the third information indicates at least a first flag bit wherein:
      the first information is used to determine at least a first tune window;
      the first wireless signal is transmitted in the first time window;
      the first wireless signal comprises at least second information;
      the transmitter of the first wireless signal is a remote user equipment;

the base station and the remote user equipment are non-co-located;
the second information includes one or more information bits;
the second information includes at least one of a first identifier, or a second identifier;
the first identifier is an integer and the second identifier is an integer;
the first identifier is used to determine the remote: user equipment, and the second identifier is used to determine, a first cell;
the first cell is a serving cell of the remote user equipment;
the transmitter of the third information is a relay user equipment;
the first channel quality includes reference signal received power (RSRP) from the remote user equipment to the relay user equipment;
the first wireless signal is used to determine the first channel quality;
the first flag bit includes one information bit;
the first flag bit is used to determine whether the relay user equipment can relay a wireless signal for the remote user equipment; and
the first time window includes at least one subframe indicated by the first information;
wherein the second processing module:
determines a second channel quality; and
transmits a fourth information, wherein;
the second channel quality includes RSRP from the remote user equipment to the first cell;
the fourth information includes the second channel quality;
the receiver of the fourth information includes the relay user equipment;
the first flag bit indicates whether the first channel quality is lower than the second channel quality, or the first flag bit indicates whether the first channel quality is higher than the second channel quality; and
the second channel quality is for a channel from the remote user equipment to the first cell.

10. The base station according to claim 9, wherein the second processing module transmits backhaul information, wherein the backhaul information comprises the second channel quality; wherein the first cell is maintained by the base station;
or the second processing module is for receiving backhaul information, wherein the backhaul information comprises the second channel quality; wherein the first cell is maintained by a network device other than the base station.

11. The base station according to claim 9, wherein the second processing module receives the first wireless signal, wherein the first wireless signal is used by the base station to determine the second channel quality.

* * * * *